Aug. 13, 1935.   K. V. ENGMAN   2,011,312
ELASTIC CONNECTIONS FOR BOARDS OR SIMILAR STRUCTURAL ELEMENTS
Filed Dec. 29, 1933
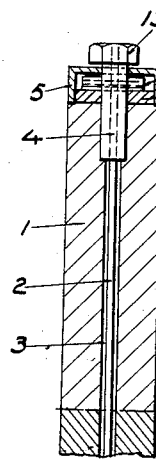
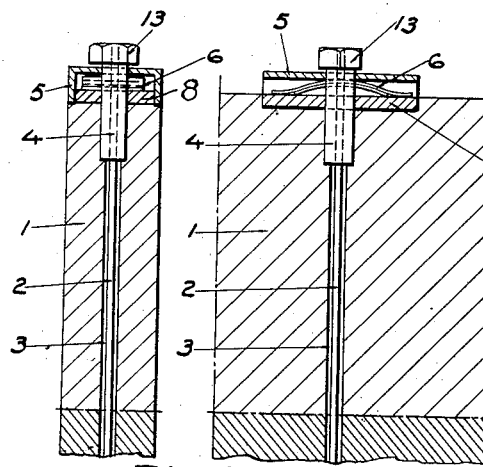
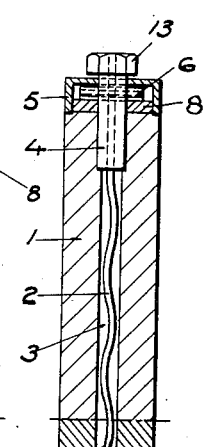
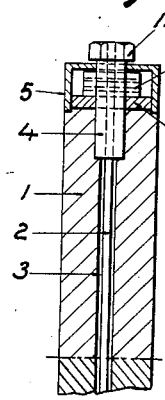
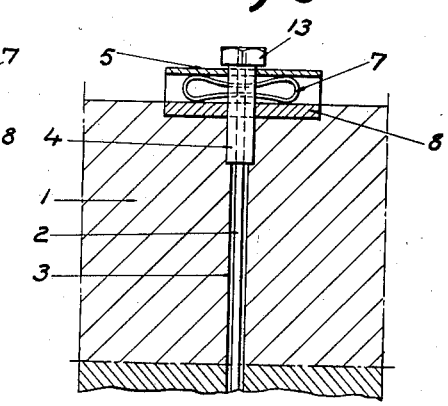
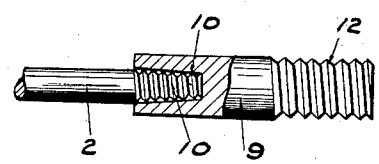

Patented Aug. 13, 1935

2,011,312

UNITED STATES PATENT OFFICE 2,011,312

ELASTIC CONNECTIONS FOR BOARDS OR SIMILAR STRUCTURAL ELEMENTS

Karl Vilhelm Engman, Uppsala, Sweden, assignor, by mesne assignments, to Theodor Pettersson, Broddbo, Sweden Application December 29, 1933, Serial No. 704,519 In Sweden October 20, 1933

4 Claims. (Cl. 20—92)

The present invention relates to connections of boards or similar structural elements which, for instance, by shrinking or swelling, change their dimensions to a considerable degree.

A connection according to the invention consists of one or more wires, strips or the like drawn through coinciding holes through a plurality of elements arranged edgewise or edge by edge, said wires etc. being adapted to keep the elements together by spring and pressure action.

The spring action may be effected by the connecting wires or strips consisting of a material of high elasticity. A material which has shown to be very suitable is rustless steel of special quality.

In order to increase the spring action of the wire, strip etc. and simultaneously to render it possible to draw the wire etc. through holes of a diameter only a trifle greater than that of the wire etc. said wire etc. may be provided with small undulations, may be specially wound or the like so as to be capable of length extension.

In order to fasten and tension the wire etc. the end or ends of same may be threaded to take up a nut or provided with a loop or the like to co-operate with a wedge, eccentric or similar straining means.

A very effective tensioning device may be obtained in the following manner:

A wire of suitable hard material, e. g. rustless iron or steel, is threaded at its one end and the outer profile is coned towards the end. A bolt of softer material, for instance brass, is provided with a conical hole of a conicity corresponding to that of the wire cub, and the conical threaded end of the wire is pressed into said hole with great pressure. Such a connection between a wire of rustless steel of a diameter of 3 mm. and a bolt of brass having a diameter of 5 mm. and a hole of a depth of 7 mm. has shown to possess a straining strength of about 700 kg. per square centimeter, that is to withstand a stress considerably surmounting the allowable stress of the wire. The bolt may in turn be provided with tensioning means, for instance thread and nut, projection or hole for a wedge, eccentric or the like.

In addition to or besides the means above described the spring action may be obtained by one or more plate springs, spiral springs or the like. An arrangement comprising one or more angularly bent plate springs effects a good spring action.

The elastic connection above described has wide application for a plurality of purposes. In order to effect tensioning of the wire, strip or the like from the outside of the body consisting of mutually connected boards or the like, the end or ends of the wire etc. may be extended to the surface of the body at which place it may be tensioned by a nut or the like arranged in a countersunk portion of the wall of the body.

The invention will be more fully described with reference to the accompanying drawing in which connection also features characterizing the invention will be set forth.

In the drawing:—

Fig. 1 is a cross sectional view of a board with wire and straining nut. Fig. 2 is a longitudinal sectional view of the same board.

Fig. 3 is a cross sectional view of a connection comprising a wire having shallow undulations.

Fig. 4 is a cross sectional view and Fig. 5 a longitudinal sectional view of an elastic connection provided with an angularly bent plate spring.

Fig. 6 is a view of a connection in which the end of the wire is pressed into a conical hole in a bolt.

In the figures reference numeral 1 designates a board, 2 a wire, 3 a hole in the boards through which the wire is drawn, 4 a straining nut having a head 13, 5 a U-shaped member serving as guiding disk for a spring 6 or 7 and as a washer for the nut 5 and 8 a washer for the spring 6.

In Figs. 1, 2, and 3 a bundle of plate springs 6 is provided between the washer 5 and the board 1 or the washer 8, respectively, whereas according to Figs. 4 and 5 an angularly bent plate spring 7 is arranged at the same place.

In Fig. 6 reference numeral 9 designates a bolt of brass provided with a conical hole 11, 10 a conical thread at the end of the wire 2 and 12 an external thread on the bolt for tensioning the wire by means of a nut or the like.

What I claim is:—

1. In a structure composed of a plurality of structural elements arranged edge by edge, coinciding transverse holes through said elements, a connecting member drawn through said holes, said member being capable of length extension and having a conical end, a bolt having a conical hole into which the conical end of the connecting member is inserted, means in combination with said conical end and said bolt to increase the frictional engagement between them and means to tension said connecting member.

2. In a structure composed of a plurality of structural elements arranged edge by edge, coinciding transverse holes through said elements, a connecting member drawn through said holes, said member being capable of length extension and having a conical chamfered end, a bolt having a conical hole into which said conical chamfered end is pressed, and means to tension said connecting member.

3. In a structure composed of a plurality of structural elements arranged edge by edge, coinciding transverse holes through said elements, a connecting member drawn through said holes, said member being capable of length extension and having a conical end, a bolt of a material softer than that of the connecting member and having a conical hole into which said conical end is inserted, means in combination with said conical end and with said bolt to increase the frictional engagement between them, and means to tension said connecting member.

4. In a structure composed of a plurality of structural elements arranged edge by edge, coinciding transverse holes through said elements, a wire of rustless steel of high elasticity drawn through said holes and spring-actuated means for tensioning said wire.

KARL VILHELM ENGMAN.